April 27, 1937.   S. J. WELTER   2,078,475
TOOL HOLDER
Filed Dec. 7, 1934
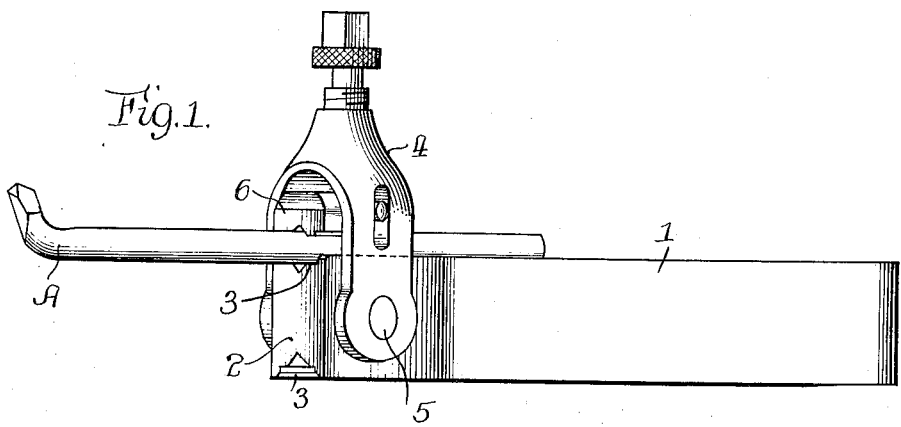
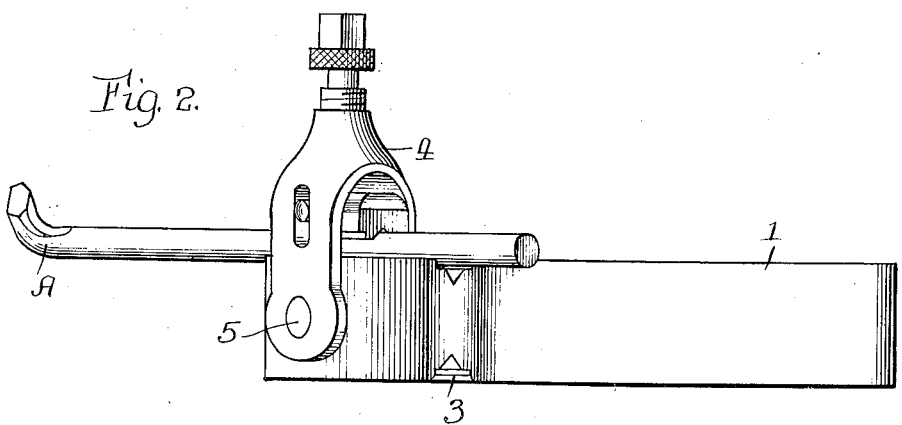
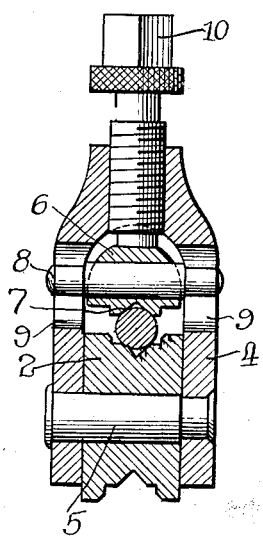
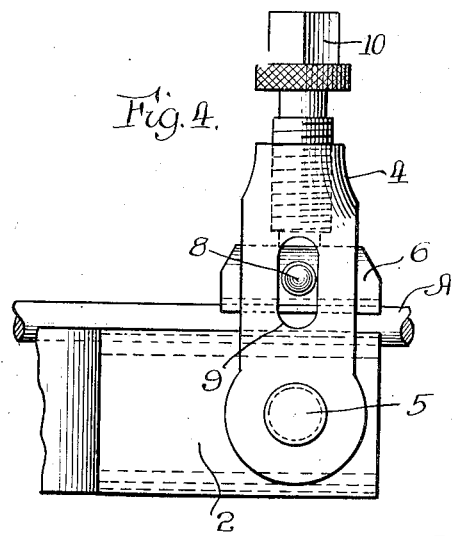
Inventor:
Sebastian J. Welter, Patented Apr. 27, 1937

2,078,475

UNITED STATES PATENT OFFICE 2,078,475

TOOL HOLDER

Sebastian J. Welter, Chicago, Ill., assignor to Armstrong Bros. Tool Co., Chicago, Ill., a corporation of Illinois Application December 7, 1934, Serial No. 756,392

1 Claim. (Cl. 29—99)

This invention relates to tool-holders having means for clamping a boring bar or other tool to the holder, and particularly to tool-holders of the type shown in the Harkness Patent No. 937,241, dated October 19, 1909. The object of the invention is to provide means for clamping the tool to the holder more firmly and reliably than has heretofore been possible, and to effect this result by simple and comparatively inexpensive means which is capable of convenient manipulation.

In the accompanying drawing:

Figure 1 is an elevation of a tool-holder embodying the features of my invention, and showing a boring bar clamped therein.

Fig. 2 is a similar view, but showing the boring bar offset to the other side of the tool-holder.

Fig. 3 is a transverse sectional view in the plane of the clamping means.

Fig. 4 is a side elevation of the forward end portion of the tool-holder.

The tool-holder shown in the drawing comprises a shank 1, the forward end of which may be bent or offset as illustrated. The shank 1 is of rectangular cross-section. The body portion 2 is longitudinally grooved in two opposite sides, as shown at 3, to receive tools of either cylindrical or rectangular cross-section.

A denotes a tool, as, for example, a boring bar.

In order to clamp the boring bar or similar tool firmly in either groove 3, as desired, I provide a yoke 4, the legs of which are pivoted to the body portion 2 by means of a pivot pin 5, said yoke and pivot being so located with reference to the body portion that the yoke may be swung past the end of the body portion so as to lie at either side thereof, as will be understood by a comparison of Figs. 1 and 2.

Within the yoke 4 is arranged a clamping block 6 of approximately the same width as the thickness of the body portion 2 and of substantial length, as shown in Fig. 4. The clamping face of the block 6 is grooved, as at 7, to engage the tool. The block 6 is connected to the yoke by means of a pin 8 extending transversely through the block and lying within elongated openings 9 formed in the legs of the yoke 4. If occasion arises, the pin 8 may be driven out of the block 6 and through the openings 9. A screw 10 has a screw-thread engagement with the yoke and bears at its inner end against the block 6, said screw extending radially of the pivot pin 5.

In the practical use of a boring bar, the cutting end is usually at a considerable distance from the point at which clamping pressure is applied to hold the bar in the tool-holder, thus setting up stresses tending to loosen or displace the bar from the tool-holder. The present construction provides a relatively great area of clamping contact between the tool-holder and the bar and thereby effectively resists the stresses tending to loosen the bar, as will be evident upon comparison of Figs. 2 and 3 of said Harkness patent with Figs. 3 and 4 of the present drawing. The clamping block 6 is connected to the yoke 4 through the medium of the pin 8 and therefore cannot become accidentally detached.

I claim as my invention:

A tool-holder comprising an elongated body portion having longitudinal grooves respectively in opposite sides, each groove being adapted to receive a tool and to engage one side of the tool with spaced contact, a yoke pivoted thereto for swinging movement selectively into cooperative relation with one or the other of said grooves and having longitudinal slots in its legs, a clamping block lying within the yoke and disposed opposite to the body portion to clamp the tool against the body portion in either one of said grooves said block having an elongated groove facing said body portion and adapted to receive said tool and to engage the other side of said tool with spaced contact and having a transverse bore, a single removable pin extending through said bore and projecting at its opposite ends into said slots respectively, to connect the block to the yoke, and removable to disconnect the block from the yoke, and a screw having a screw-thread engagement with said yoke and adapted to bear against the block to clamp the tool securely against the body portion with full centering and substantially equal bearing engagement in interposed relation between said last mentioned groove and either one of said first mentioned grooves.

S. J. WELTER.